United States Patent [19]
Yaoita

[11] Patent Number: 5,832,892
[45] Date of Patent: Nov. 10, 1998

[54] SPARK IGNITION INTERNAL COMBUSTION ENGINE

[76] Inventor: Yasuhito Yaoita, Wellstone Terrace 2, 12-32, Nagahama, Kanazawa-ku, Yokohama, 236, Japan

[21] Appl. No.: 731,378

[22] Filed: Oct. 11, 1996

[51] Int. Cl.$^6$ .............................. F02B 19/04; F02B 19/12
[52] U.S. Cl. ............................................ 123/260; 123/289
[58] Field of Search .................................... 123/289, 261, 123/269, 260

[56] References Cited

U.S. PATENT DOCUMENTS

| | | | |
|---|---|---|---|
| 4,011,841 | 3/1977 | Sato et al. | 123/32 B |
| 4,078,533 | 3/1978 | Nohira | 123/148 DS |
| 4,483,289 | 11/1984 | Paul et al. | 123/263 |
| 5,076,229 | 12/1991 | Stanley | 123/289 |
| 5,307,773 | 5/1994 | Suzuki | 123/293 |

OTHER PUBLICATIONS

Satoshi Kato and Shigeru Onishi, SAE (Society of Automotive Engineers) Paper No. 871689, 1987, "New Mixture Formation Technology of Direct Fuel Stratified Combustion SI Engine (OSKA)".

Shoji Kanai et al, The trade journal 'Nainen kikan' (Internal Combustion Engines), Tokyo, Sankai–dô Publishing, Jan. 1991 P44–47, "Evaluation of Piston".

Shinji Kojima, 'Nainen kikan' (Internal Combustion Engines), Tokyo, Sankai–dô Publishing, Feb. 1990 P35–43, "Present Stage of Knock Reserch".

Primary Examiner—Willis R. Wolfe
Assistant Examiner—Hieu T. Vo

[57] ABSTRACT

A spark ignition internal combustion engine with improved anti-knocking function. The engine comprises: a cylinder; a cylinder head attached to an end of the cylinder; a piston slidably mounted in the cylinder, a center line of a piston pin of the piston is shifted on the thrust side of the piston with respect to a center line of an outer periphery of the piston; a main combustion chamber with an ignition plug; and a sub-combustion chamber with an inlet opening on an inner wall of the main combustion chamber facing an outer surface of the piston on the anti-thrust side thereof, area of the inlet opening is smaller than that of the outer surface.

10 Claims, 12 Drawing Sheets

SPARK IGNITION INTERNAL COMBUSTION ENGINE

BACKGROUND OF THE INVENTION

1. Field of the Invention

The present invention relates to a spark ignition internal combustion engine, and more particularly to a spark ignition internal combustion engine with improved anti-knocking function.

2. Description of the Related Art

FIG. 13 is a cross-sectional view of a stratified charge engine (OSKA) which is disclosed in "Nainenkikan" (Internal Combustion Engine),Tokyo,Sanlkai-do Publishing), July, 1988, p.35.

In FIG. 13, fuel jet after impinging on an impingement surface 17 is dispersed from an edge 18 into a deep concave portion 19 formed on the upper surface of a piston. Then, squish flow into the deep concave portion 19 prevents the dispersed fuel jet from flowing out of the deep concave portion 19. As a result, air exists at an end gas zone 20 where usually knocking is liable to occur, which prevents knocking, that is, abnormal combustion of mixture at the end gas zone 20. Therefore, anti-knocking function in the above-mentioned stratified charge engine is more effective than that in a premix combustion engine.

SAE paper-871689 discloses almost the same engine as the aforementioned one (OSKA), however, pistons of the engines disclosed in the above documents have the same shape as that of direct injection diesel engine, so that the piston is heavier than that of gasoline engine, which causes the upper limit of rotation speed to be restricted in comparison with the premix spark ignition internal combustion engine.

SUMMARY OF THE INVENTION

The present invention has been made in consideration of the above-mentioned drawbacks of the conventional engines, and it is therefore an object of the present invention to provide a spark ignition internal combustion engine with improved anti-knocking function without the deep concave portion of the direct injection diesel engine on the upper surface of a piston.

A spark ignition internal combustion engine comprises: a cylinder; a cylinder head attached to an end of the cylinder; a piston slidably mounted in the cylinder, a center line of a piston pin of the piston is shifted on the thrust side of the piston with respect to a center line of an outer periphery of the piston; a main combustion chamber with an ignition plug; and a sub-combustion chamber with an inlet opening on an inner wall of the main combustion chamber facing an outer surface of the piston on the anti-thrust side thereof, area of the inlet opening is smaller that of the outer surface.

In the above-mentioned spark ignition internal combustion engine, the inlet opening may be formed on the cylinder head, and the outer surface of the piston on the anti-thrust side may be a side face of a projection formed on a top face of the piston.

Another spark ignition internal combustion engine according to the present invention further comprises another ignition plug in the sub-combustion chamber in addition to the aforementioned engine according to the present invention.

Still in a spark ignition internal combustion engine according to the present invention, the inlet opening of the sub-combustion chamber may be formed on an upper portion of the cylinder.

Further, it is preferable to mount another ignition plug in the sub-combustion chamber in addition to the above construction of the engine.

Still further, a spark ignition internal combustion engine according to the present invention, the ignition plug is preferably installed at an innermost portion of the sub-combustion chamber.

BRIEF DESCRIPTION OF THE DRAWINGS

The present invention will be more apparent from the ensuring description with reference to the accompanying drawings wherein.

DETAILED DESCRIPTION OF PREFERRED EMBODIMENTS

Now, the spark ignition internal combustion engine according to the first embodiment of the present invention will be explained with reference to FIGS. 1, 2 and 8.

Figure 1:
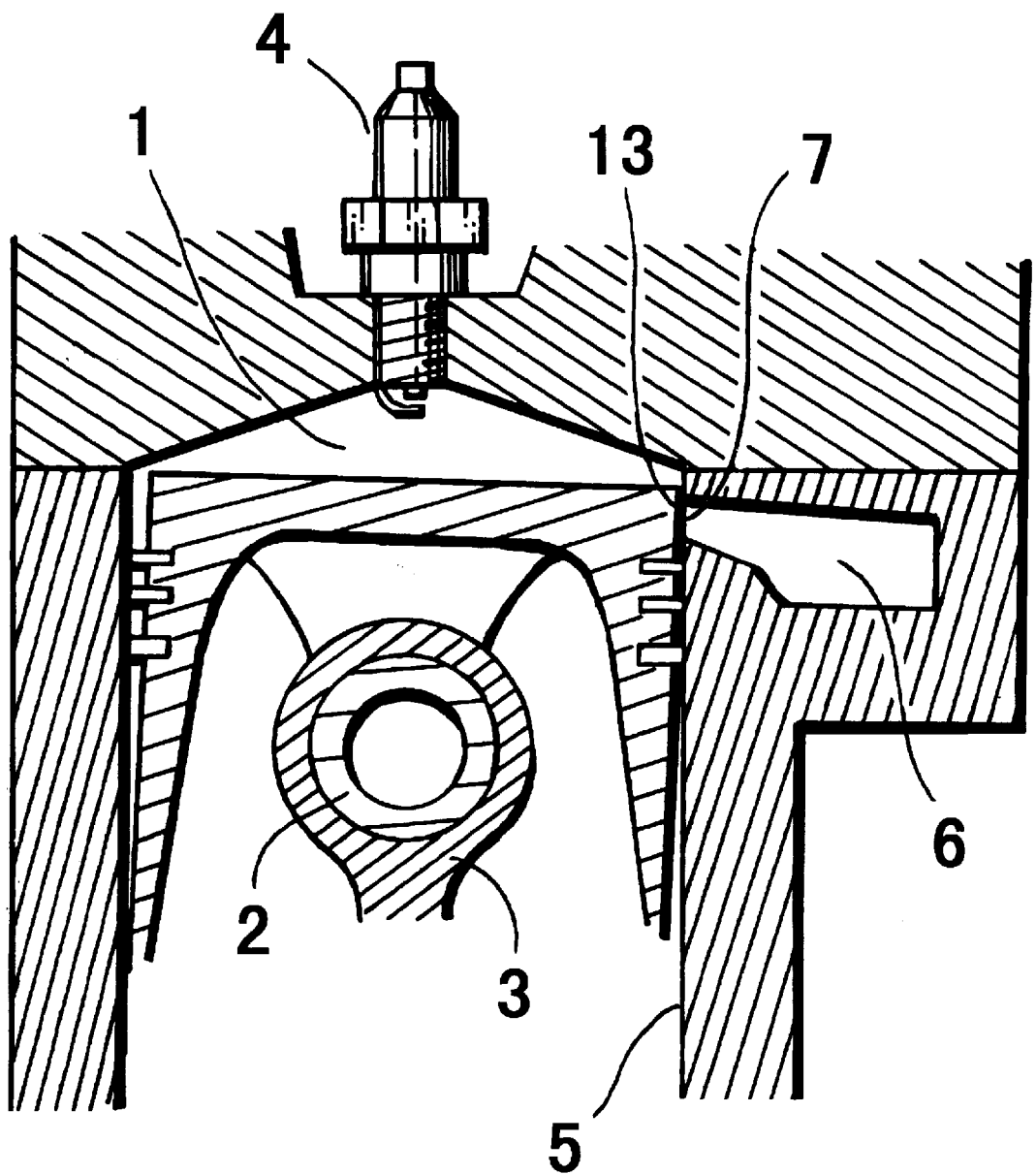
FIG. 1 is a cross-sectional view of a spark ignition internal combustion engine according to the first embodiment of the present invention in which an inlet opening of sub-combustion chamber on the upper surface of the inner wall of the cylinder on an anti-thrust side during combustion of mixture in a main combustion chamber.

FIG. 1 is a cross-sectional view of a portion near a combustion chamber of the spark ignition internal combustion engine at the start of combustion process, in which the inclination of the piston with respect to a piston pin is emphatically illustrated than actual. Numeral 1 is a main combustion chamber and 2 the piston pin, which connects a small end portion of a connecting rod and the piston to each other. An ignition plug 4 is installed on an inner wall in the main combustion chamber 1 on the cylinder head side. On the upper wall of the cylinder on the anti-thrust side (thrust side is defined as a side that the connecting rod rotates in expansion process, left side in FIG. 1), a sub-combustion chamber 6 and an inlet opening 7 thereof are formed.

Figure 2:
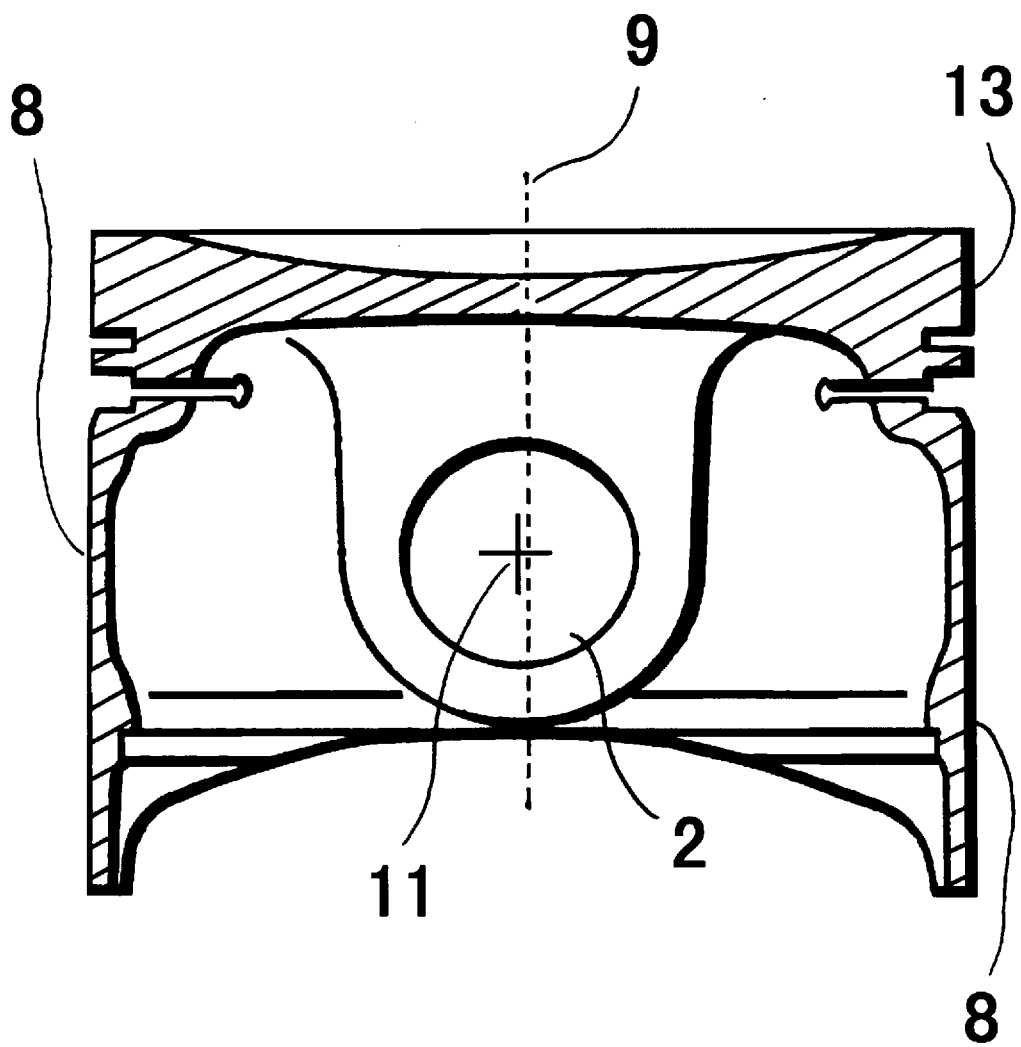
FIG. 2 is a cross-sectional view of the piston shown in FIG. 1.

FIG. 2 is a cross-sectional view of the piston. A central line 11, which is shown as a crossing point of a cross, of a piston pin 2 shifts toward the thrust side with respect to an center line 9, which is indicated as a broken line, of the outer peripheral surface 8 of the piston.

Figure 3:
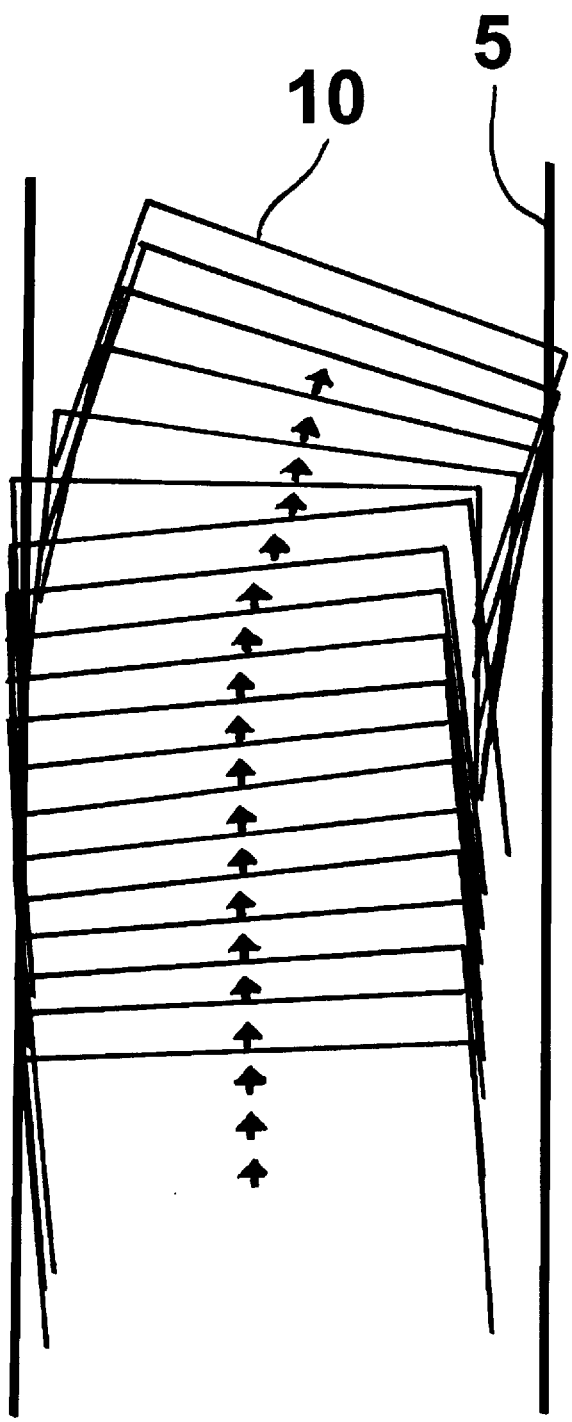
FIG. 3 is a schematic view of the inside of a cylinder of a conventional engine in which the center line of a piston pin shifts toward a thrust side by 1.0 mm with respect the center line of the outer peripheral surface of the piston in expansion process.
Figure 4:
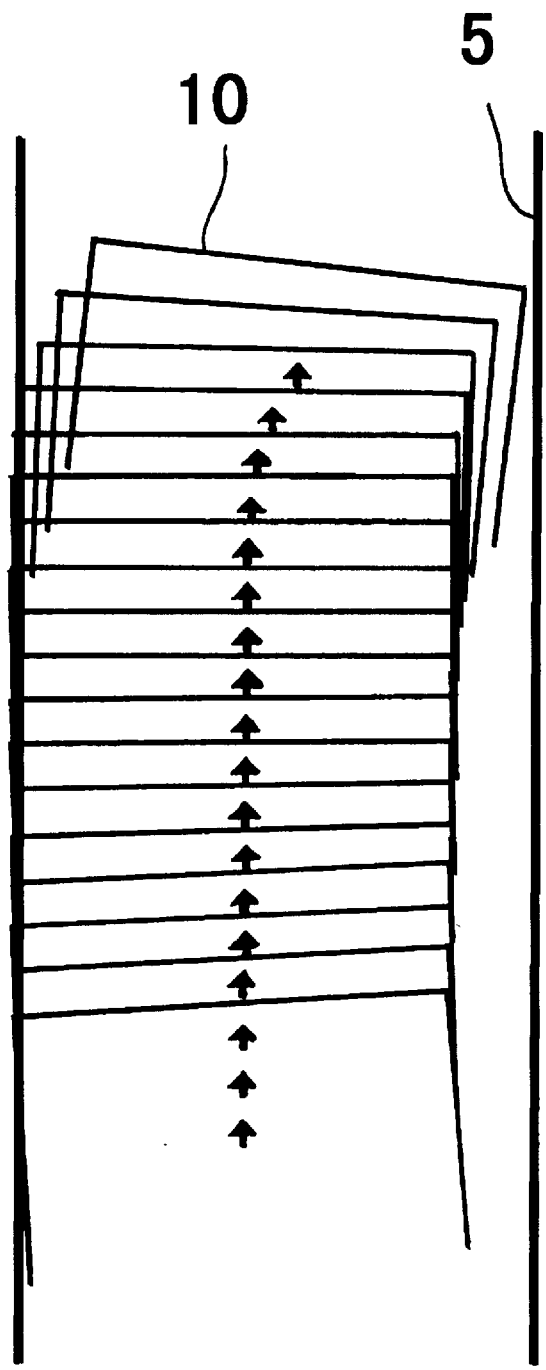
FIG. 4 is a schematic view of the inside of a cylinder of a conventional engine in which the center line of the piston pin does not shift with respect the center line of the outer peripheral surface of the piston in expansion process.
Figure 5:
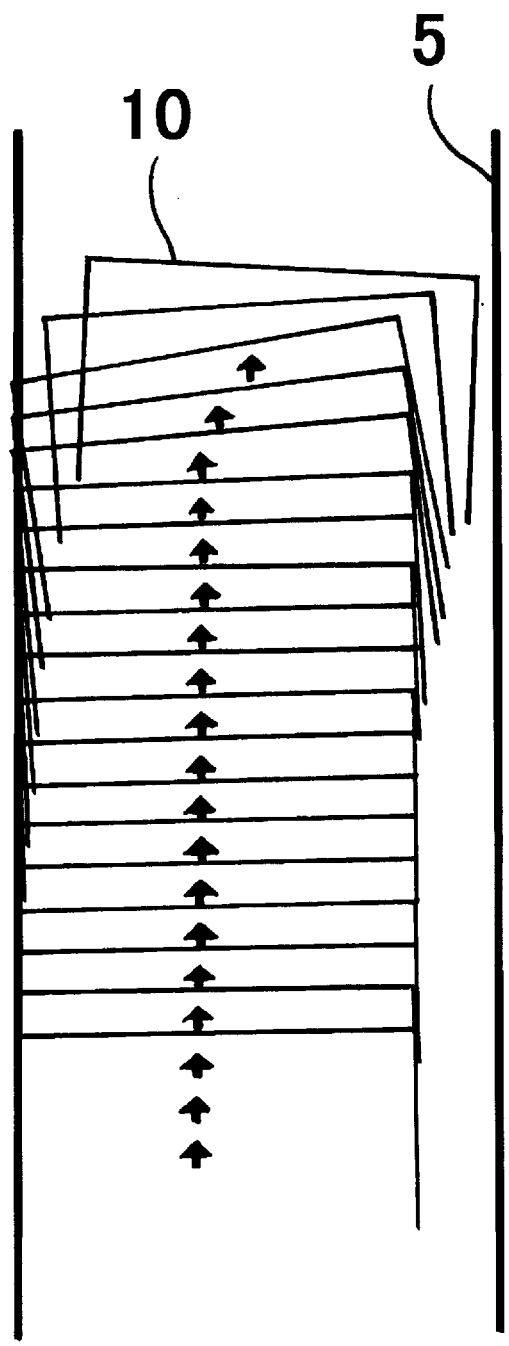
FIG. 5 is a schematic view of the inside of a cylinder of a conventional engine in which the center line of the piston pin shifts toward an anti-thrust side by 0.5 mm with respect the center line of the outer peripheral surface of the piston in expansion process.
Figure 6:
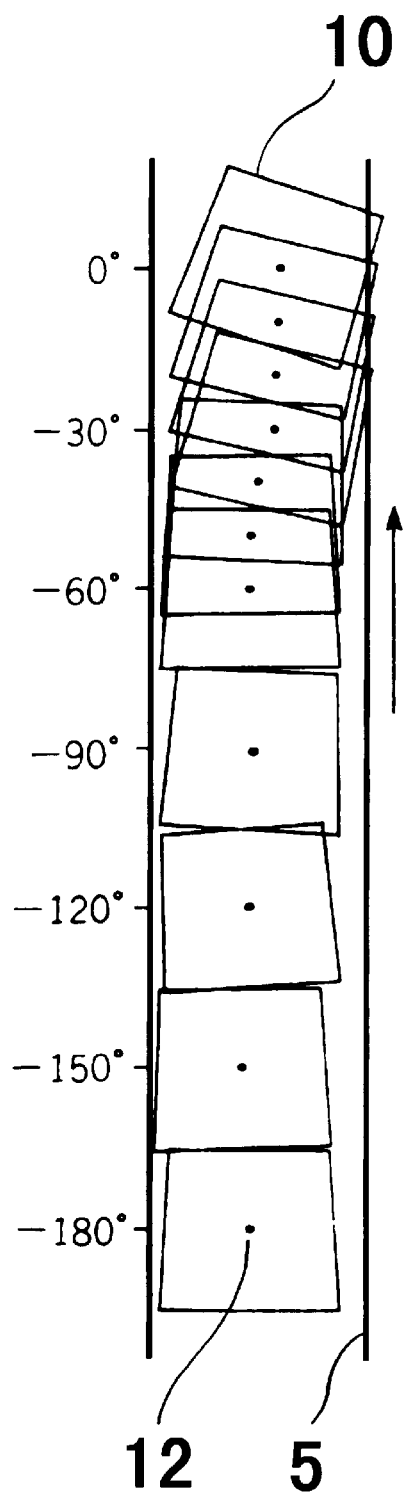
FIG. 6 is a schematic view of the inside of a cylinder of a conventional engine in which the center line of the piston pin is shifted toward the thrust side by 1.0 mm with respect the center line of the outer peripheral surface of the piston in compression process.
Figure 7:
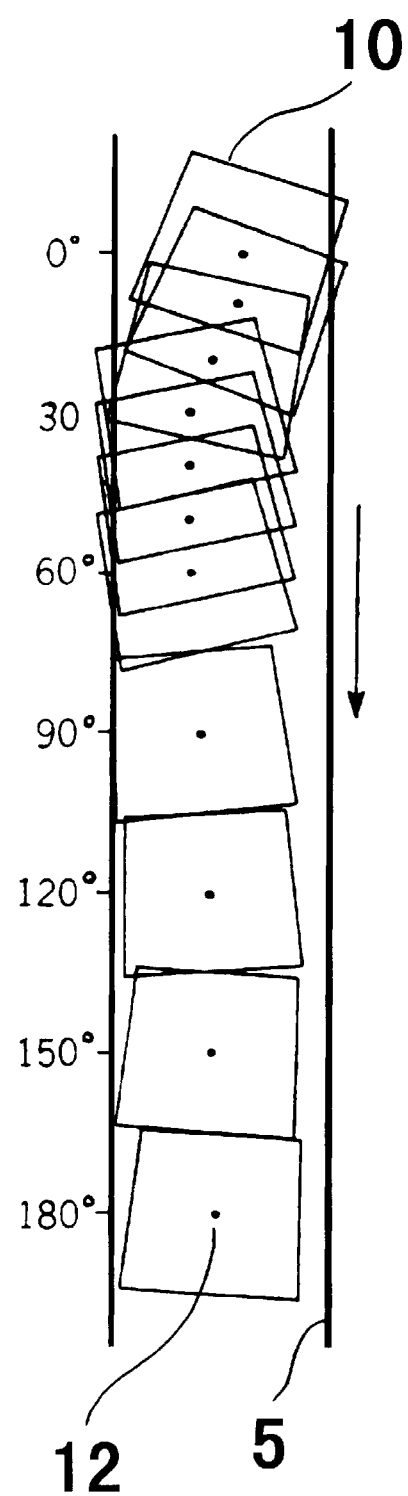
FIG. 7 is a schematic view of the inside of the cylinder under the same test conditions as FIG. 3 but illustrated in a manner different from that of FIG. 3 in expansion process.
Figure 10:
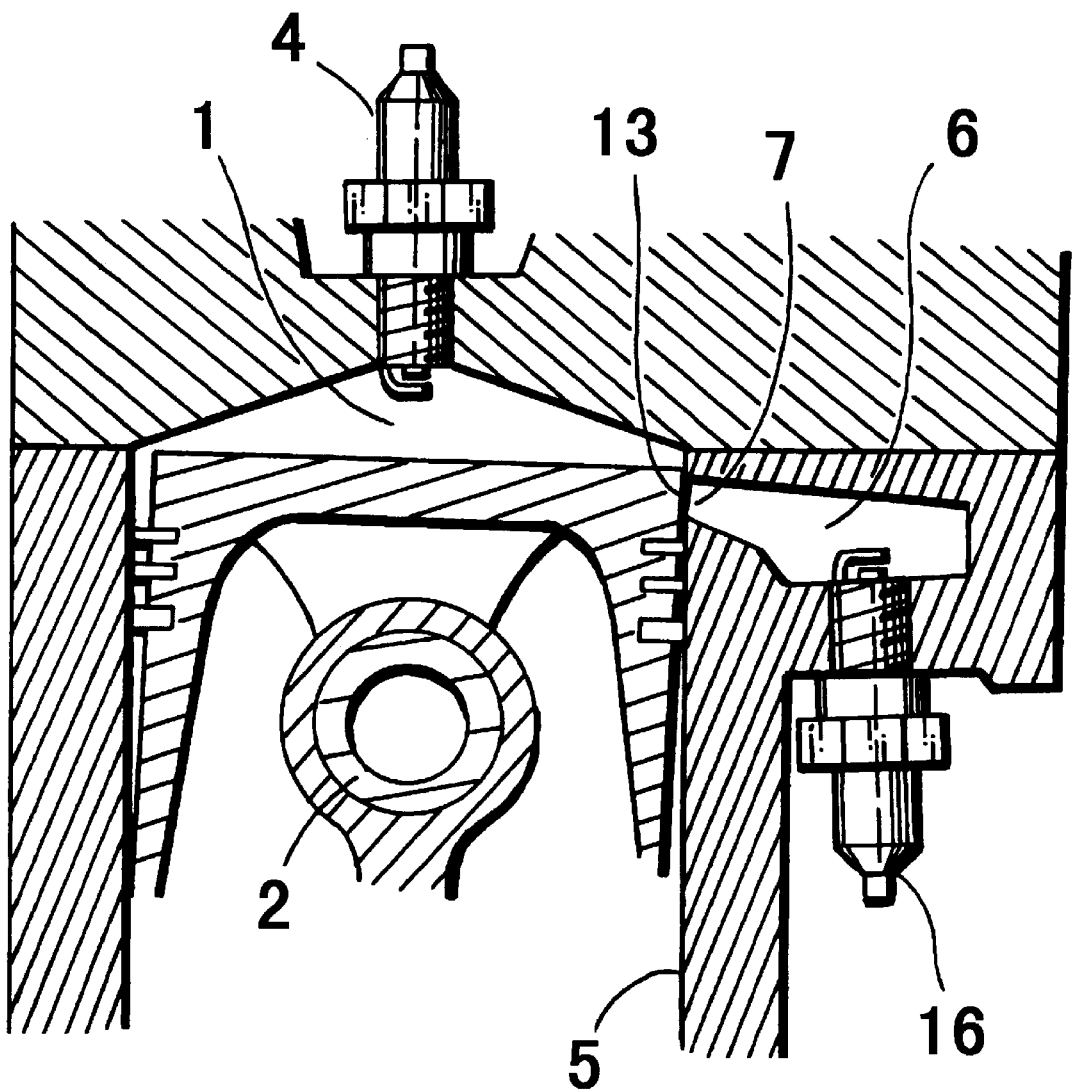
FIG. 10 is a cross-sectional view of the spark ignition internal combustion engine according to the third embodiment of the present invention, in which an ignition plug is mounted in the sub-combustion chamber shown in FIG. 1.

FIGS. 3 to 5 are a part of a drawing which is disclosed in "Nainenkikan" (Internal Combustion Engine), Tokyo, Sankai-do Publishing), January, 1988, p.47, FIG. 10, and FIGS. 6 and 7 attached to this specification are also a part of a figure disclosed in page 45, FIG. 6 in the same document. The contours of pistons in accordance with crank angle are illustrated in the above figures. In these figures, small circles 12 and arrows indicate the transition of the center line 11 of the piston pin 2.

In these figures, the deformations of the cylinder and the piston are not considered, so that in FIGS. 6 and 7, the top land 13 of the piston at a top dead point in compression process, which is illustrated at the top, and the piston just below the top piston are positioned in the body of the cylinder on the anti-thrust side. As a result, the following phenomenon will clearly be understood.

In FIGS. 3, 6 and 7, the increase of gas pressure in the main combustion chamber 1 causes the piston, just before and after the time that the piston reaches the top dead point in compression process, to rotate toward the anti-thrust side inner wall with respect to the piston pin 2 (on the right side of FIG. 1). Then, the clearance between the inner wall 5 of the cylinder on the anti-thrust side and the top land 13 of the piston on the anti-thrust side opposing the inner wall 5 becomes almost zero, and the period of time that the clearance stays almost zero also becomes long. In FIGS. 4 and 5, the clearance between the surface of the piston at the top dead point in compression process and the inner wall of the cylinder does not become zero. The present invention utilizes the aforementioned phenomenon.

In the first embodiment shown in FIG. 1, the amount of shift of the center line 11 of the piston pin 2 toward the thrust side is determined in such a manner that the clearance between the inner wall 5 of the cylinder on the anti-thrust side around the inlet opening 7 and the top land 13 of the piston on the anti-thrust side opposing the inner wall 5 becomes almost zero at high-load operation while flame front reaches the inlet opening 7 of the sub-combustion chamber 6 from the ignition plug 4. The dimensions of the inlet opening 7 are set to be smaller than the top land 13 of the piston on the thrust side. The volume of the sub-combustion chamber 6 is determined so as not to generate knocking therein.

Next, the effect of the spark ignition internal combustion engine according to the first embodiment of the present invention will be explained. At the top dead point in compression process at high-load operation and immediately after the piston is positioned at this position, as described above, the increase of gas pressure causes the piston to rotate toward the anti-thrust side thereof, and the top land 13 on the anti-thrust side of the piston covers the inlet opening 7. As a result, the sub-combustion chamber 6 and the main combustion chamber 1 are separated from each other, which allows temperature and pressure of the gas not burnt in the sub-combustion chamber 6 to become lower than those of gas burning in the main combustion chamber 1 while the top land 13 on the anti-thrust side covers inlet opening 7. The sub-combustion chamber 6 is positioned at an end gas zone (that is, an end of flame propagating route).

It is disclosed that the continuous compression by a piston or flame causes self-ignition of unburnt mixture at the end gas zone, that is, knocking, in "Nainenkikan" (Internal Combustion Engine), Tokyo, Sankai-do Publishing), July, 1988, p.35, Section 4.2 (3) regarding "Selfignition Mechanism". Therefore, in the present invention, the mixture in the sub-combustion chamber 6 is relieved in histories of temperature and pressure during the combustion in the main combustion chamber, which increases anti-knocking function.

Figure 8:
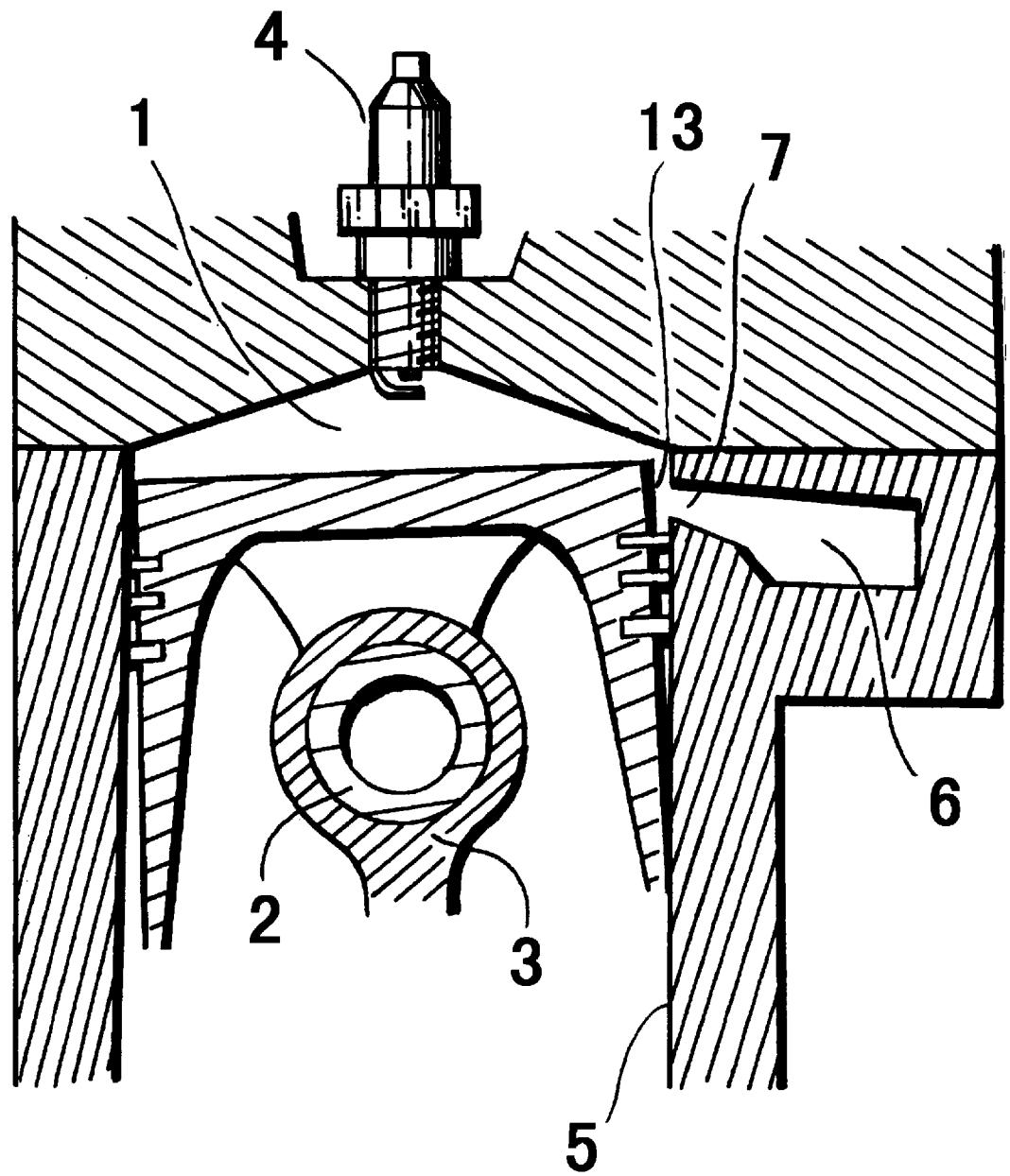
FIG. 8 is a cross-sectional view of the spark ignition internal combustion engine according to the first embodiment of the present invention in which the sub-combustion chamber is opened.

As illustrated in FIG. 8, after the inlet opening 7 of the sub-combustion chamber 6 opens, flame enters the sub-combustion chamber 6 through the inlet opening 7 from the main combustion chamber 1. At that moment, the falling of the piston already starts. As a result, at the completion of the combustion in the sub-combustion chamber 6, knocking is not liable to occur.

The amount of mixture in the main combustion chamber 1 is remainder after the amount of mixture in the sub-combustion chamber 6 is subtracted from total mixture. Therefore, the mixture in the main combustion chamber 1 is not liable to cause knocking.

Figure 13:
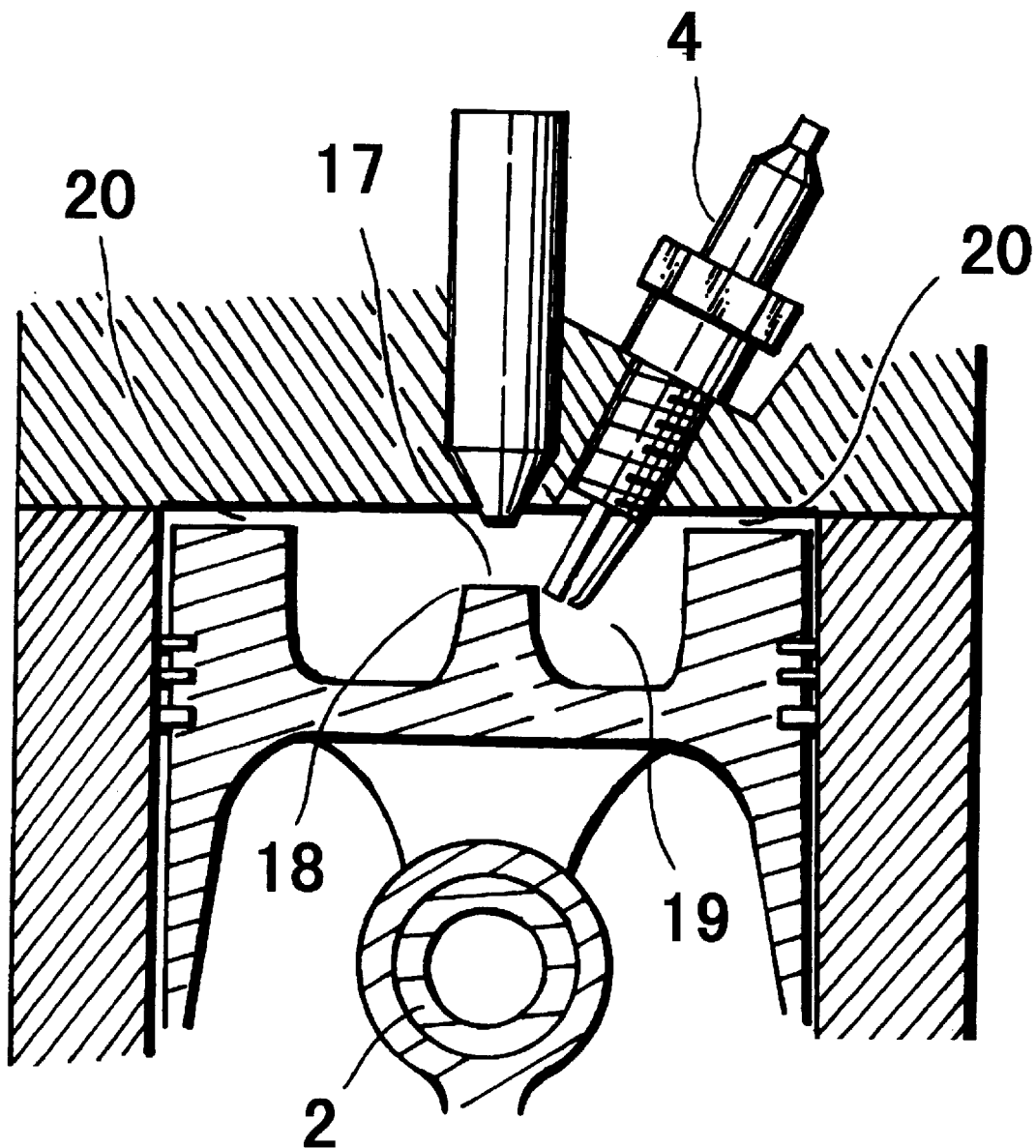
FIG. 13 is a cross-sectional view of the combustion chamber of a conventional OSKA engine.

As described above, anti-knocking function of the main combustion chamber 1 shown in FIG. 1 is improved in comparison with a conventional premix internal combustion engine. As a result, in the spark ignition internal combustion engine according to the present invention, compression ratio may be increased and fuel consumption may be decreased. Further, the increase of the amount of mixture absorbed will provide large output. Moreover, as long as the mixture is formed in the sub-combustion chamber 6 and the main combustion chamber 1, this invention may be applied to an engine with direct fuel injection fuel supply system as well as an engine with premix system in which fuel is fed to an inlet pipe. The same piston as used in a premix spark ignition internal combustion engine may be used for the spark ignition internal combustion engine according to the present invention, allowing the weight of the piston according to the present invention to be lighter than that shown in FIG. 13, resulting in faster movement of the piston of the present invention.

Next, spark ignition internal combustion engines according to other embodiments will be explained below in comparison with that of the first embodiment described above.

Figure 9:
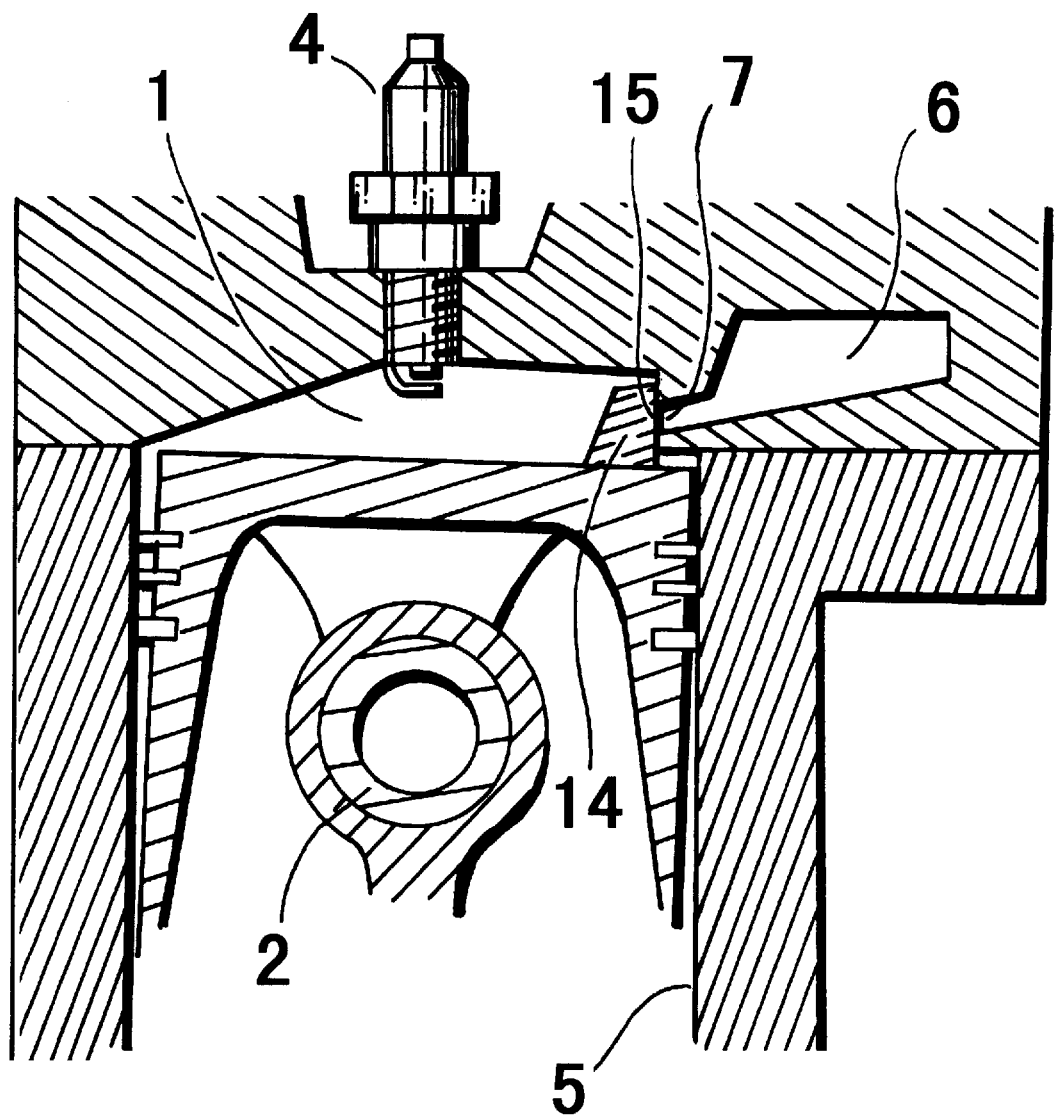
FIG. 9 is a cross-sectional view of the spark ignition internal combustion engine according to the second embodiment of the present invention in which the sub-combustion chamber and the inlet opening thereof are formed on a portion of a cylinder head corresponding to the end gas zone.

The sub-combustion chamber 6 may be installed at a position other than the upper portion of the cylinder as shown in FIG. 1. As illustrated in FIG. 9, as the second embodiment of the present invention, the subcombustion chamber 6 and the inlet opening 7 may be formed on a portion corresponding to an end gas zone of the cylinder head. In this embodiment, a projection 14 is formed on the top surface of the piston, and a side wall 15 of the projection 14 on the anti-thrust side is set to be in parallel with the center line of the cylinder, and the inlet opening 7 is formed on the inner wall of the cylinder head facing the side wall 15 in combustion process.

In the second embodiment shown in FIG. 9, the moment that the inlet opening 7 of the sub-combustion chamber 6 opens, in other words, the amount of the shift of the center line 11 of the piston pin 2 on the thrust side is set to be the same as the first embodiment shown in FIG. 1. The inlet area of the inlet opening 7 is formed so as to be smaller than the area of the side wall 15.

Figure 11:
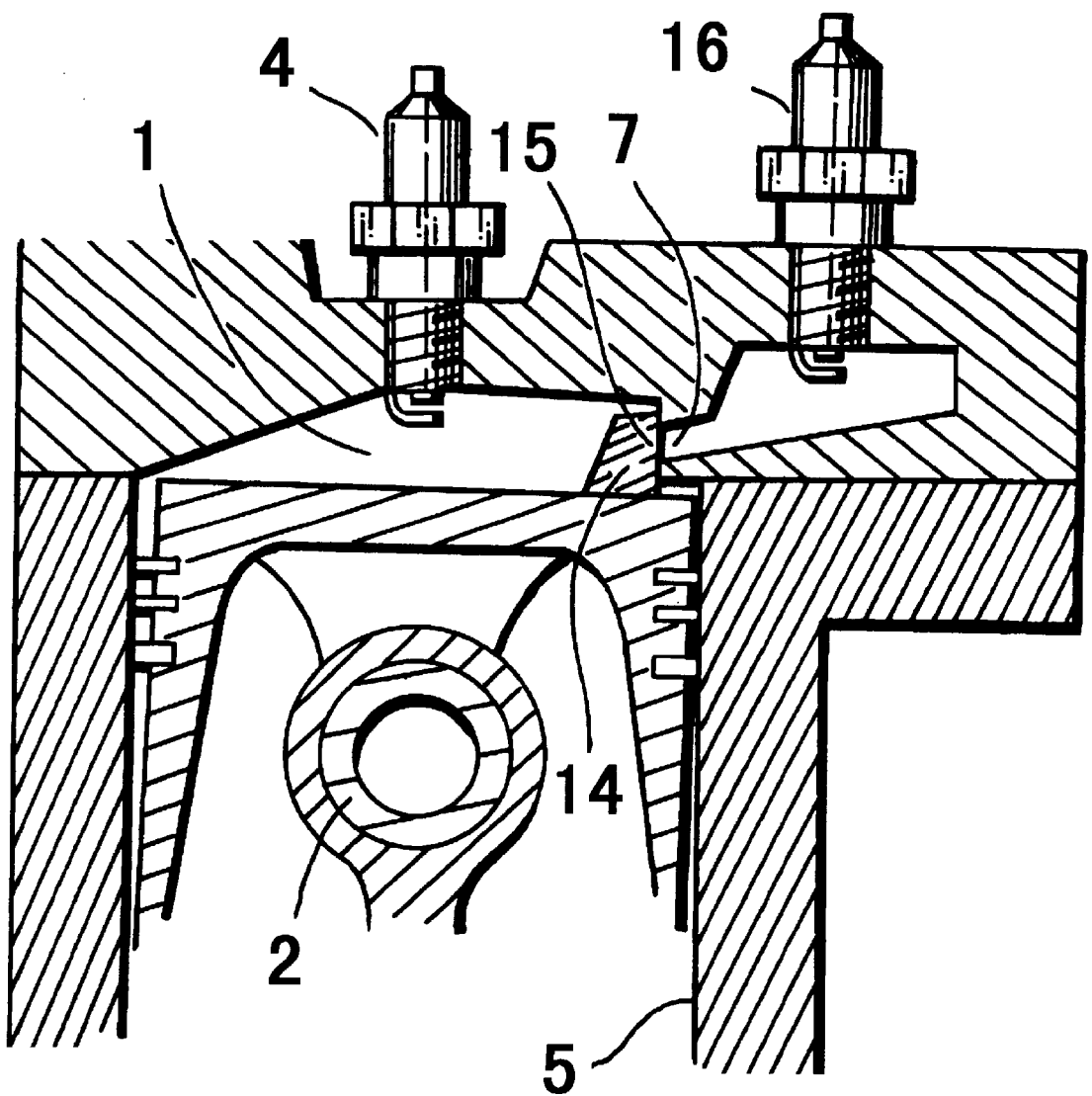
FIG. 11 is a cross-sectional view of the spark ignition internal combustion engine according to the fourth embodiment, in which an ignition plug is mounted in the sub-combustion chamber shown in FIG. 9.

As illustrated in FIG. 10 and 11, as the third and fourth embodiments, another ignition plug 16 may be placed arbitrary wall surface in the sub-combustion chamber 6 shown in FIG. 1 or 9, which further improves anti-knocking function since the combustion time of the mixture in the sub-combustion chamber 6 is shortened by the flame propagating from the main combustion chamber 1 as well as the flame from the additional ignition plug 16.

In the third and fourth embodiments, the timing that the inlet opening is opened may be adjusted in a manner different from that in the above-mentioned embodiment. In the third and fourth embodiments, it is possible to delay the timing that the inlet opening 7 is opened in comparison with the embodiments shown in FIGS. 1 and 9. The timing that the inlet opening 7 of the sub-combustion chamber 6 opens varies according to the amount of shift of the center line 11 of the piston pin 2 on the thrust side. The additional ignition plug 16 works after the combustion of the mixture in the main combustion chamber 1, which causes the timing that the mixture in the sub-combustion chamber 6 starts burning to be delayed further, resulting in improved anti-knocking function.

Figure 12:
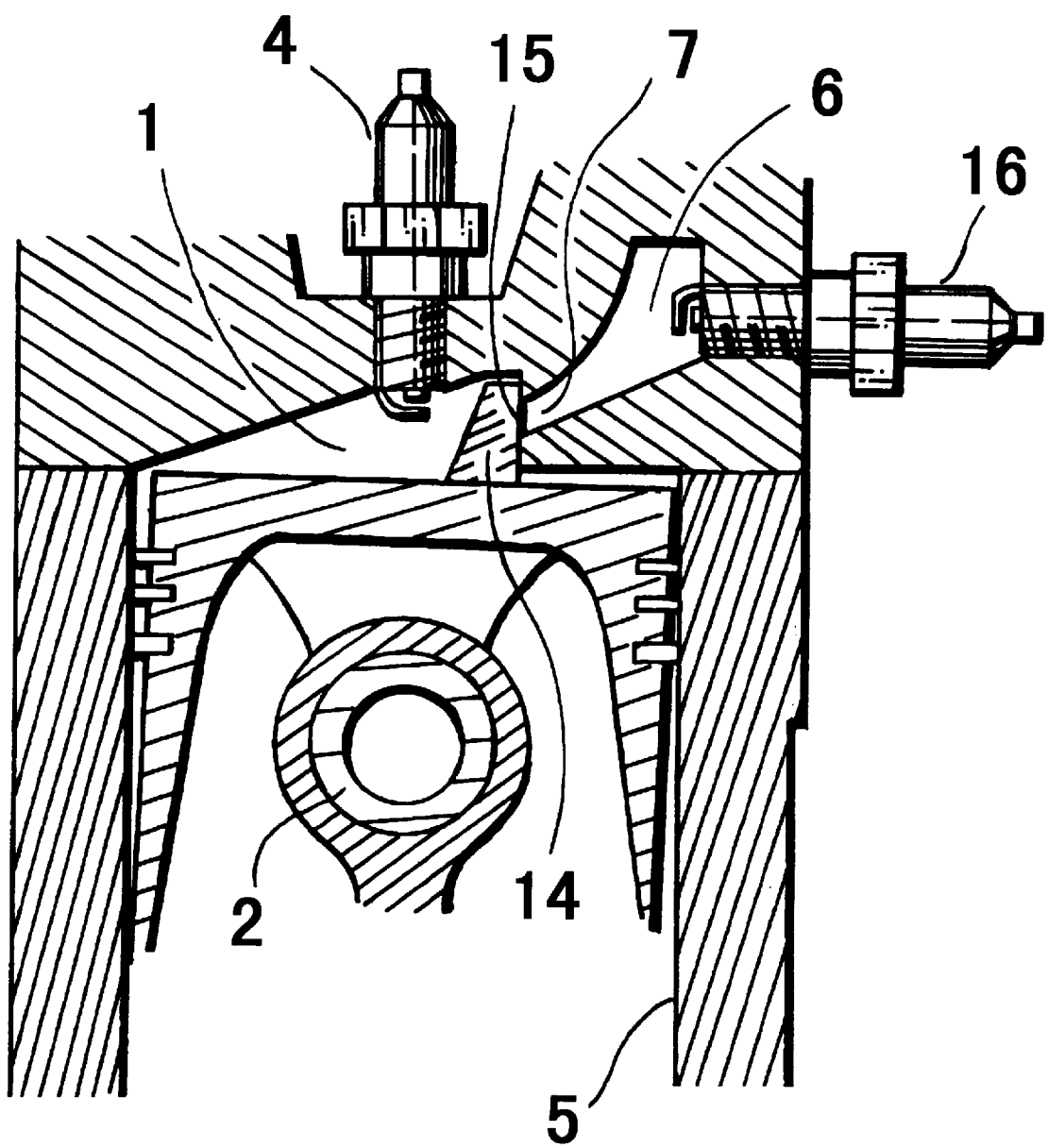
FIG. 12 is a cross-sectional view of the spark ignition internal combustion engine according to the fifth embodiment of the present invention, in which the inlet opening of the sub-combustion chamber is formed on the inner surface of the cylinder head on a way of a route that flame propagates in the main combustion chamber.

In the aforementioned embodiments, the sub-combustion chamber 6 is provided on the end gas zone in the main combustion chamber 1, however, as illustrated in FIG. 12, as the fifth embodiment of the present invention, the sub-combustion chamber 6 and the inlet opening 7 may be formed on a portion of the cylinder head on the route that the flame from the ignition plug 4 propagates.

In the fifth embodiment, like the fourth embodiment shown in FIG. 11, the side wall 15 of the projection 14 on the anti-thrust side is set to be in parallel with the center line of the cylinder, and the inlet opening 7 is formed on the inner wall of the cylinder head facing the side wall 15 in combustion process. In addition to the above, the amount of the shift of the center line 11 of the piston pin 2 on the thrust side is set in such a manner that the inlet opening 7 opens after the flame front generated at the ignition plug 4 reaches the inlet opening 7 of the sub-combustion chamber 6. This setting allow the additional ignition plug 16 to ignite the mixture in the sub-combustion chamber 6 after the flame propagating from the ignition plug 4 passes through the inlet opening 7.

In the third to fifth embodiments, if the additional ignition plug 16 is installed in the innermost portion of the sub-combustion chamber 6, that is, far from the inlet opening 7, already-combust-gas flows into the subcombustion chamber 6 through the inlet opening 7 from the main combustion chamber 1 prevents a part of the mixture in the sub-combustion chamber 6 adjacent to the inlet opening 7 from being burnt. This part of the mixture is positioned the farthest from the additional ignition plug 16 and is usually liable to cause knocking. Therefore, anti-knocking function further improved in this embodiment.

What is claimed is:

1. A spark ignition internal combustion engine comprising:

a cylinder;

a cylinder head attached to an end of said cylinder;

a piston slidably mounted in said cylinder, a center line of a piston pin of said piston shifted on a thrust side of the piston with respect to a center line of an outer periphery of the piston, an outer surface of said piston on an anti-thrust side being in parallel to a center line of said cylinder;

a main combustion chamber with an ignition plug; and a sub-combustion chamber with an inlet opening on an inner wall of said main combustion chamber facing an outer surface of the piston on the anti-thrust side thereof, area of said inlet opening is smaller than that of said outer surface, wherein said outer surface of the piston on the anti-thrust side and a surface continuing an outer periphery of the inlet opening face to each other in parallel at top dead point, and at top dead point in compression process at high-load operation a clearance between said two surfaces becomes substantially zero.

2. The spark ignition internal combustion engine as claimed in claim 1, wherein said inlet opening is formed on the cylinder head.

3. The spark ignition internal combustion engine as claimed in claim 2, wherein said outer surface of the piston on the anti-thrust side is a side face of a projection formed on a top face of said piston.

4. The spark ignition internal combustion engine as claimed in claim 2, further comprising another ignition plug in said sub-combustion chamber.

5. The spark ignition internal combustion engine as claimed in claim 3, further comprising another ignition plug in said sub-combustion chamber.

6. The spark ignition internal combustion engine as claimed in claim 4, wherein said ignition plug is installed at an innermost portion of the sub-combustion chamber.

7. The spark ignition internal combustion engine as claimed in claim 5, wherein said ignition plug is installed at an innermost portion of the sub-combustion chamber.

8. A spark ignition internal combustion engine comprising:

a cylinder;

a cylinder head attached to an end of said cylinder;

a piston slidably mounted in said cylinder, a center line of a piston pin of said piston shifted on a thrust side of the piston with respect to a center line of an outer periphery of the piston, an outer surface of said piston on an anti-thrust side being in parallel to a center line of said cylinder;

a main combustion chamber with an ignition plug; and a sub-combustion chamber with an inlet opening on an inner wall of said main combustion chamber facing an outer surface of the piston on the anti-thrust side thereof, said inlet opening of the sub-combustion chamber formed on an upper portion of the cylinder, area of said inlet opening smaller than that of said outer surface, wherein said outer surface of the piston on the anti-thrust side and a surface continuing an outer periphery of the inlet opening face to each other in parallel at top dead point, and at top dead point in compression process at high-load operation a clearance between said two surfaces becomes substantially zero.

9. The spark ignition internal combustion engine as claimed in claim 8, further comprising another ignition plug in said sub-combustion chamber.

10. The spark ignition internal combustion engine as claimed in claim 9, wherein said ignition plug is installed at an innermost portion of the sub-combustion chamber.

\* \* \* \* \*